United States Patent
Liu et al.

(10) Patent No.: US 12,371,515 B2
(45) Date of Patent: Jul. 29, 2025

(54) MULTISTAGE EMULSION POLYMER AND PROCESS OF PREPARING THE SAME

(71) Applicants: Dow Global Technologies LLC, Midland, MI (US); Rohm and Haas Company, Collegeville, PA (US)

(72) Inventors: Han Liu, Shanghai (CN); Yuehan Hu, Shanghai (CN); Zhi Juan Gong, Shanghai (CN); Ling Li, Louyang (CN); Xiangting Dong, Shanghai (CN); Hengtong Wei, Shanghai (CN)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 672 days.

(21) Appl. No.: 17/781,897

(22) PCT Filed: Dec. 25, 2019

(86) PCT No.: PCT/CN2019/128210
§ 371 (c)(1),
(2) Date: Jun. 2, 2022

(87) PCT Pub. No.: WO2021/128053
PCT Pub. Date: Jul. 1, 2021

(65) Prior Publication Data
US 2023/0021323 A1    Jan. 26, 2023

(51) Int. Cl.
| | | |
|---|---|---|
| C08F 220/18 | (2006.01) | |
| C08F 2/22 | (2006.01) | |
| C08F 226/10 | (2006.01) | |
| C08F 265/04 | (2006.01) | |

(52) U.S. Cl.
CPC .............. *C08F 2/22* (2013.01); *C08F 220/18* (2013.01); *C08F 226/10* (2013.01); *C08F 265/04* (2013.01)

(58) Field of Classification Search
CPC ............................ C08F 2/22; C08F 220/1806; C08F 220/1807; C08F 220/1808; C08F 220/1805; C08F 220/1809; C08F 220/1811; C08F 226/06; C08F 226/08; C08F 226/10; C08F 226/12
See application file for complete search history.

(56) References Cited

U.S. PATENT DOCUMENTS

| | | | |
|---|---|---|---|
| 6,552,116 B1 | 4/2003 | Pakusch et al. | |
| 2004/0096474 A1* | 5/2004 | Merlau | A61K 8/87 424/401 |
| 2009/0143540 A1* | 6/2009 | Ghosh | C09D 133/12 525/417 |
| 2012/0121903 A1* | 5/2012 | Betremieux | C08F 265/00 428/375 |
| 2014/0315018 A1* | 10/2014 | Yamagata | C09J 7/22 525/204 |

FOREIGN PATENT DOCUMENTS

| | | |
|---|---|---|
| AU | 573819 B | 6/1988 |
| EP | 609756 A2 | 8/1994 |
| EP | 1362907 A2 | 11/2003 |
| EP | 2065447 A1 | 6/2009 |

OTHER PUBLICATIONS

Fox, Bull. Am. Physics Soc., 1956, vol. 1, Issue No. 3, p. 123.
"Polymer Handbook", edited by J. Brandrup and E.H. Immergut, Interscience Publishers. p. 277 (1990).

* cited by examiner

*Primary Examiner* — Robert C Boyle
(74) *Attorney, Agent, or Firm* — CANTOR COLBURN LLP

(57) ABSTRACT

A multistage emulsion polymer comprising a first polymer and a second polymer comprising structural units of a nitrogen-containing heterocyclic monomer at specific weight ratios of the first polymer to the second polymer and a Tg difference between the first and second polymers; the multistage emulsion polymer suitable for use in coating applications to provide coating films with improved dirt pick-up resistance without compromising film formation properties.

9 Claims, No Drawings

MULTISTAGE EMULSION POLYMER AND PROCESS OF PREPARING THE SAME

FIELD OF THE INVENTION

The present invention relates to a multistage emulsion polymer and a process of preparing the same.

INTRODUCTION

In exterior coating applications, dirt pick-up resistance (DPUR) is a key property to enable coatings to maintain color and gloss upon exposure to the elements such as sunlight. Commonly used approaches to improve DPUR properties in the coating industry include, for example, increasing glass transition temperature of acrylic polymer binders or incorporation of conventional photocrosslinkers such as benzophenones (BzP) into coatings. These approaches may either require higher dosage of coalescents for film formation or have performance variance issues as ultraviolet (UV) curing of BzP depends on weather conditions.

It is therefore desirable to provide an emulsion polymer suitable for coating applications that provides exterior coatings such as elastomeric wall coatings, with improved dirt pick-up resistance without compromising film formation properties.

SUMMARY OF THE INVENTION

The present invention provides a multistage emulsion polymer comprising a first polymer and a second polymer at a weight ratio of the first polymer to the second polymer in the range of from 55:45 to 95:5, where Tg of the first polymer is at least 35° C. higher than that of the second polymer. The multistage emulsion polymer of the present invention comprises a specific combination of structural units of a cycloalkyl (meth)acrylate, a $C_6$-$C_{10}$ alkyl (meth)acrylate, or mixtures thereof; and structural units of a nitrogen-containing heterocyclic monomer; wherein structural units of the nitrogen-containing heterocyclic monomer are present in the second polymer, and optionally also in the first polymer. Such multistage emulsion polymer is particularly suitable for use in coating applications to provide coating films with improved dirt pick-up resistance without compromising film formation properties.

In a first aspect, the present invention is a multistage emulsion polymer comprising a first polymer and a second polymer, wherein the multistage emulsion polymer comprises, by weight based on the weight of the multistage emulsion polymer, from 0.1% to 10% of structural units of a nitrogen-containing heterocyclic monomer and 5% or more of structural units of a cycloalkyl (meth)acrylate, a $C_6$-$C_{10}$ alkyl (meth)acrylate, or mixtures thereof;

wherein the second polymer comprises structural units of the nitrogen-containing heterocyclic monomer;

wherein Tg of the first polymer is at least 35° C. higher than that of the second polymer;

wherein the weight ratio of the first polymer to the second polymer is in the range of from 55:45 to 95:5.

In a second aspect, the present invention is a process of preparing the multistage emulsion polymer of the first aspect by multistage free-radical polymerization. The process comprises:

(i) preparing a first polymer in an aqueous medium by free-radical polymerization, and (ii) preparing a second polymer in the presence of the first polymer obtained from step (i) by free-radical polymerization, forming the multistage emulsion polymer comprising the first polymer and the second polymer; wherein the multistage emulsion polymer comprises, by weight based on the weight of the multistage emulsion polymer, from 0.1% to 10% of structural units of a nitrogen-containing heterocyclic monomer, and 5% or more of structural units of a cycloalkyl (meth)acrylate, a $C_6$-$C_{10}$ alkyl (meth)acrylate, or mixtures thereof;

wherein the second polymer comprises structural units of the nitrogen-containing heterocyclic monomer;

wherein Tg of the first polymer is at least 35° C. higher than that of the second polymer;

wherein the weight ratio of the first polymer to the second polymer is in the range of from 55:45 to 95:5.

DETAILED DESCRIPTION OF THE INVENTION

"Aqueous" dispersion herein means that particles dispersed in an aqueous medium. By "aqueous medium" herein is meant water and from zero to 30%, by weight based on the weight of the medium, of water-miscible compound(s) such as, for example, alcohols, glycols, glycol ethers, glycol esters, or mixtures thereof.

The term "acrylic" as used herein includes (meth)acrylic acid, alkyl (meth)acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

As used herein, the term structural units, also known as polymerized units, of the named monomer refers to the remnant of the monomer after polymerization. For example, a structural unit of methyl methacrylate is as illustrated:

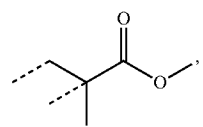

where the dotted lines represent the points of attachment of the structural unit to the polymer backbone.

"Glass transition temperature" ($T_g$) in the present invention can be measured by various techniques including, for example, differential scanning calorimetry (DSC) or calculation by using a Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g(calc.)$ is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$; all temperatures being in K. The glass transition temperatures of the homopolymers may be found, for example, in "Polymer Handbook", edited by J. Brandrup and E. H. Immergut, Interscience Publishers.

"Multistage emulsion polymer" herein means an emulsion polymer, which is prepared by the sequential addition of two or more different monomer compositions, comprising at least a first polymer and a second polymer. By "first polymer" (also as "first stage polymer") and "second polymer" (also as "the second stage polymer") mean these polymers having different compositions and formed in different stages of multistage free-radical polymerization in preparing the multistage emulsion polymer. Each of the stages is sequentially polymerized and different from the immediately proceeding and/or immediately subsequent stage by a difference in monomer composition. "Weight of multistage emulsion polymer" in the present invention refers to the dry or solids weight of the multistage emulsion polymer.

The multistage emulsion polymer of the present invention may comprise structural units of one or more cycloalkyl (meth)acrylates, $C_6$-$C_{10}$-alkyl (meth)acrylates, or mixtures thereof; which may be present in the first polymer, the second polymer, or combinations thereof. Suitable cycloalkyl (meth)acrylates may include, for example, cyclohexyl (meth)acrylate, methcyclohexyl (meth)acrylate, dihydrodicyclopentadienyl (meth)acrylate, trimethylcyclohexyl (meth)acrylate, t-butyl cyclohexyl (meth)acrylate, or mixtures thereof. Preferred cycloalkyl (meth)acrylates include cyclohexyl methacrylate, cyclohexyl acrylate, methcyclohexyl acrylate, or mixtures thereof. The $C_6$-$C_{10}$-alkyl (meth)acrylates refer to alkyl esters of (meth)acrylic acid containing a linear or branched alkyl with from 6 to 10 carbon atoms, preferably, from 6 to 8 carbon atoms. Examples of suitable $C_6$-$C_{10}$-alkyl (meth)acrylates include 2-ethylhexyl acrylate, 2-ethylhexyl methacrylate, or mixtures thereof. Preferably, the multistage emulsion polymer of the present invention comprises structural units of cyclohexyl methacrylate, 2-ethylhexyl acrylate, or mixtures thereof; which may be present in the first polymer, the second polymer, or combinations thereof. The multistage emulsion polymer may comprise, by weight based on the weight of the multistage emulsion polymer, structural units of the cycloalkyl (meth)acrylate, the $C_6$-$C_{10}$-alkyl (meth)acrylate, or mixtures thereof, in a combined amount of 5% or more, 6% or more, 7% or more, 8% or more, 10% or more, 12% or more, 14% or more, 15% or more, 16% or more, 18% or more, or even 20% or more, and at the same time, 90% or less, 80% or less, 70% or less, 60% or less, 50% or less, 48% or less, 45% or less, 42% or less, 40% or less, 39% or less, 38% or less, 36% or less, 35% or less, 32% or less, 31% or less, or even 30% or less.

The multistage emulsion polymer of the present invention may also comprise structural units of one or more nitrogen-containing heterocyclic monomers, which may be present in the second stage polymer, and optionally also present in the first polymer. The nitrogen-containing heterocyclic monomer refers to a nitrogen-containing heterocyclic compound comprising at least one ethylenically unsaturated bond that is polymerizable with other monomers. The nitrogen-containing heterocyclic monomer can be an ethylenically unsaturated imidazole, imidazoline, amidine, pyridine, pyrrole, pyrrolidine, pyrrolidone, or caprolactam; or combinations thereof. Preferred nitrogen-containing heterocyclic monomers are vinylpyrrolidones including, for example, N-vinyl-2-pyrrolidone, N-methylvinylpyrrolidone, N-(meth)acryloyl-2-pyrrolidone, methylvinylpyrrolidones, or mixtures thereof. More preferably, the nitrogen-containing heterocyclic monomer is N-vinyl-2-pyrrolidone. The multistage emulsion polymer may comprise, by weight based on the weight of the multistage emulsion polymer, structural units of the nitrogen-containing heterocyclic monomer in an amount of 0.1% or more, 0.2% or more, 0.3% or more, 0.4% or more, 0.5% or more, 0.6% or more, 0.7% or more, 0.8% or more, 0.9% or more, or even 1.0% or more, and at the same time, 10% or less, 9% or less, 8% or less, 7% or less, 6% or less, or even 5% or less. For example, the second polymer in the multistage emulsion polymer may comprise, by weight based on the weight of the second polymer, structural units of the nitrogen-containing heterocyclic monomer in an amount of 0.2% or more, 0.4% or more, 0.6% or more, 0.8% or more, 1.0% or more, 1.2% or more, 1.4% or more, 1.6% or more, 1.8% or more, 2.0% or more, or even 2.5% or more, and at the same time, 80% or less, 70% or less, 60% or less, 50% or less, 40% or less, 30% or less, or even 25% or less. The first polymer in the multistage emulsion polymer may comprise by weight based on the weight of the first polymer, structural units of the nitrogen-containing heterocyclic monomer in an amount of from zero to less than 5%, for example, less than 4%, less than 3%, less than 2%, less than 1.5%, less than 1.25%, less than 1%, less than 0.5%, or even less than 0.2%, by weight based on the weight of the first polymer. In some embodiments, from 50% to 100% of structural units of the nitrogen-containing heterocyclic monomer in the multistage emulsion polymer are present in the second polymer, preferably, 60% or more, 70% or more, 80% or more, 90% or more, 95% or more.

The multistage emulsion polymer of the present invention may further comprise structural units of one or more monoethylenically unsaturated functional monomer carrying at least one functional group selected from a carboxyl, carboxylic anhydride, sulfonic acid, amide, sulfonate, phosphoric acid, phosphonate, phosphate, or hydroxyl group, a salt thereof, or combinations thereof; which may be present in the first polymer, the second polymer, or combinations thereof, preferably in the first polymer. Examples of suitable monoethylenically unsaturated functional monomers include α,β-ethylenically unsaturated carboxylic acids including an acid-bearing monomer such as methacrylic acid, acrylic acid, itaconic acid, maleic acid, or fumaric acid; or a monomer bearing an acid-forming group which yields or is subsequently convertible to, such an acid group such as anhydride, (meth)acrylic anhydride, or maleic anhydride; sodium styrene sulfonate (SSS), sodium vinyl sulfonate (SVS), 2-acrylamido-2-methylpropanesulfonic acid (AMPS), sodium salt of 2-acrylamido-2-methyl-1-propanesulfonic acid, ammonium salt of 2-acrylamido-2-methyl-1-propane sulfonic acid; sodium salt of allyl ether sulfonate; acrylamide, methacrylamide, monosubstituted (meth)acrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide; hydroxy-functional (meth)acrylic acid alkyl ester such as hydroxyethyl methacrylate and hydroxypropyl methacrylate; phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R_{p1})-C(O)-O-(R_{p2}O)_p-P(O)(OH)_2$, wherein $R_{p1}$=H or $CH_3$, $R_{p2}$=alkyl and p=1-10, such as SIPOMER PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, allyl ether phosphate, vinyl phosphonic acid, salts thereof; or mixtures thereof. Preferred monoethylenically unsaturated functional monomers are phosphoethyl methacrylate (PEM), acrylic acid (AA), acrylamide, methacrylic acid (MAA), or mixtures thereof. The multistage emulsion polymer may comprise, by weight based on the weight of the multistage emulsion polymer, zero or more, 0.1% or more, 0.3% or more, 0.5% or more, 0.8% or more, 0.9% or more, 1.0% or more, 1.1% or more 1.2% or more, or even 1.5% or more, and at the same time, 10% or less, 8% or less, 6% or less, 5% or less, 4.5% or less, 4% or less, 3.5% or less, 3% or less, or even 2.8% or less of structural units of the monoethylenically unsaturated functional monomers.

The multistage emulsion polymer of the present invention may also comprise structural units of one or more additional monoethylenically unsaturated nonionic monomers that are different from the monomers described above, which may be present in the first polymer, the second polymer, or combinations thereof. The additional monoethylenically unsaturated nonionic monomers may include $C_1$-$C_4$-alkyl (meth) acrylate such as methyl acrylate, methyl methacrylate, butyl acrylate, butyl meth acrylate, ethyl acrylate, and ethyl methacrylate; alkylvinyldialkoxysilanes; vinyltrialkoxysilanes such as vinyltriethoxysilane and vinyltrimethoxysilane; (meth)acryl functional silanes including, for example, (meth)acryloxyalkyltrialkoxysilanes such as gamma-methacryloxypropyltrimethoxysilane and methacryloxypropyltriethoxysilane; 3-methacryloxypropylmethyldimethoxysilane; 3-methacryloxypropyltrimethoxysilane; 3-methacryloxypropyltriethoxysilane; or mixtures thereof. The multistage emulsion polymer may comprise, by weight based on the weight of the multistage emulsion polymer, from zero to 90%, from 0.05% to 85%, from 0.1% to 80%, from 0.3% to 78%, from 0.5% to 75%, from 1% to 70%, from 5% to 65%, or from 10% to 60% of structural units of the additional monoethylenically unsaturated nonionic monomers.

The multistage emulsion polymer of the present invention may comprise structural units of one or more multiethylenically unsaturated monomers, which may be present in the first polymer, the second polymer, or combinations thereof, preferably in the second polymer. Suitable multiethylenically unsaturated monomers may include, for example, butadiene, allyl (meth)acrylate, divinyl benzene, ethylene glycol dimethacrylate, butylene glycol dimethacrylate, or mixtures thereof. The multistage emulsion polymer may comprise, by weight based on the weight of the multistage emulsion polymer, from zero to 3.0%, from 0.05% to 0.8%, or from 0.1% to 0.5% of structural units of the multiethylenically unsaturated monomers.

Preferably, the first polymer in the multistage emulsion polymer comprises structural units of the cycloalkyl (meth) acrylate, the $C_6$-$C_{10}$-alkyl (meth)acrylate, or mixtures thereof; structural units of the monoethylenically unsaturated functional monomer; and optionally structural units of the additional monoethylenically unsaturated nonionic monomer. Preferably, the second polymer in the multistage emulsion polymer comprises structural units of vinylpyrrolidones; structural units of the cycloalkyl (meth)acrylate, the $C_6$-$C_{10}$-alkyl (meth)acrylate, or mixtures thereof; and optionally structural units of the additional monoethylenically unsaturated nonionic monomer.

In some embodiments, the multistage emulsion polymer comprises, by weight based on the weight of the multistage emulsion polymer, from 8% to 70% of structural units of the cycloalkyl (meth)acrylate, the $C_6$-$C_{10}$-alkyl (meth)acrylate, or combinations thereof; and from 0.5% to 10% of structural units of vinylpyrrolidones.

The first polymer and the second polymer in the multistage emulsion polymer may be present at a weight ratio of the first polymer to the second polymer in the range of from 55:45 to 95:5, from 56:44 to 94:6, from 57:43 to 93:7, from 57.5:42.5 to 92.5:7.5, from 58:42 to 92:8, from 59:41 to 91:9, from 60:40 to 90:10, from 62.5:37.5 to 88:12, from 65:35 to 87.5:12.5, from 67.5:32.5 to 85:15, from 70:30 to 82.5:17.5, from 72.5:27.5 to 82:18, or from 75:25 to 80:20. The multistage emulsion polymer may optionally comprise a minor amount of a third polymer, for example, less than 10% by weight of the multistage emulsion polymer, without compromising DPUR and film formation properties. In some embodiments, the total amount of the first polymer and the second polymer is from 90% to 100% of the multistage emulsion polymer, from 92% to 100%, from 95% to 100%, from 98% to 100%, or from 99% to 100%, by weight based on the weight of the multistage emulsion polymer.

Total concentration of the structural units of monomers described above in the multistage emulsion polymer is equal to 100%. Types and levels of the monomers described above may be chosen to provide the multistage emulsion polymer with a Tg suitable for different applications, for example, in the range of from −30 to 50° C., from −25 to 45° C., from −20 to 40° C., or from −15 to 35° C. Tg of the first polymer is 35° C. or higher than that of the second polymer, for example, 36° C. or more, 37° C. or more, 38° C. or more, 39° C. or more, 40° C. or more, 41° C. or more, 42° C. or more, 43° C. or more, 44° C. or more, or even 45° C. or more. For example, the first polymer may have a Tg of from −5 to 55° C., from 5 to 45° C., or from 15 to 35° C. The second polymer may have a Tg of from −55 to 10° C., from −45 to 0° C., or from −35 to −10° C. Tg values herein can be calculated by the Fox equation. Without being bounded by a theory, the multistage emulsion polymer may comprise multiple different phases (layers or domains) formed by at least the first polymer and the second polymer. The multistage emulsion polymer may have core-shell structure.

The multistage emulsion polymer of the present invention may have a particle size of from 50 nanometers (nm) to 500 nm, from 60 nm to 300 nm, or from 70 nm to 180 nm. The particle size may be measured by a Brookhaven BI-90 Plus Particle Size Analyzer as described in the Examples section below.

The multistage emulsion polymer of the present invention is typically present in the form of an aqueous dispersion comprising water. Water may be present, by weight based on the total weight of the aqueous dispersion, from 30% to 90% or from 40% to 80%. The aqueous dispersion of the multistage emulsion polymer may have a minimum film formation temperature (MFFT) in the range of from −20 to −80° C., for example, from 0 to 75° C., from 10 to 70° C., from 20 to 65° C., or from 25 to 60° C. MFFT can be measured according to the test method described in the Examples section below.

The process of preparing the multistage emulsion polymer of the present invention may include multistage free-radical polymerization, preferably emulsion polymerization, in which at least two stages are formed sequentially, which usually results in the formation of the multistage emulsion polymer comprising at least two polymer compositions, optionally the different stages can be formed in different reactors. The process of preparing the multistage emulsion polymer may include (i) preparing the first polymer in an aqueous medium by free-radical polymerization, and (ii) preparing the second polymer in the presence of the first polymer obtained from step (i) by free-radical polymerization. The process may include a stage of polymerization of a first monomer composition (also as "stage 1 monomer composition") to form the first polymer, a stage of polymerization of a second monomer composition (also as "stage 2 monomer composition") to form the second polymer. Each stage of the free-radical polymerization can be conducted by polymerization techniques well known in the art such as emulsion polymerization of the monomers described above. The first and second monomer compositions may each independently include the monomers described above for forming the structural units of the first and second polymers, respectively. For example, the second monomer composition comprises the nitrogen-containing heterocyclic monomer such as vinylpyrrolidones. Total concentration of the monomer compositions for preparing the first polymer and the second polymer, respectively, is equal to 100%. The monomer compositions for preparing the first polymer and the second polymer may be added neat or as an emulsion in water; or added in one or more additions or continuously, linearly or nonlinearly, over the reaction period of preparing the first polymer and the second polymer, respectively, or combinations thereof. Temperature suitable for emulsion polymerization processes may be lower than 100° C., in the range of from 30 to 95° C., or in the range of from 50 to 90° C.

In the multistage free radical polymerization process, free radical initiators may be used in each stage. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers used for preparing the multistage emulsion polymer. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Chelating agents for the metals may optionally be used.

In the multistage free radical polymerization process, a surfactant may be used in each stage. The surfactant may be added prior to or during the polymerization of the monomers, or combinations thereof. A portion of the surfactant can also be added after the polymerization. These surfactants may include anionic and/or nonionic surfactants. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The surfactant may be used in an amount of from 0.1% to 5%, from 0.15% to 4%, from 0.2% to 3%, or from 0.2% to 2%, by weight based on the total weight of monomers used for preparing the multistage emulsion polymer.

In the multistage free-radical polymerization process, a chain transfer agent may be used in each stage of polymerization. Examples of suitable chain transfer agents include 3-mercaptopropionic acid, methyl mercaptopropionate, butyl mercaptopropionate, n-dodecyl mercaptan (nDDM), methyl 3-mercaptopropionate (MMP), butyl 3-mercaptopropionate (BMP), benzenethiol, azelaic alkyl mercaptan, or mixtures thereof. The chain transfer agent may be used in an effective amount to control the molecular weight of the multistage emulsion polymer. The chain transfer agent may be present in an amount of from zero to 3%, from 0.01% to 2%, from 0.02% to 1%, or from 0.03% to 0.5%, by weight based on the total weight of monomers used for preparing the multistage emulsion polymer.

The pH value of the obtained aqueous dispersion of multistage emulsion polymer may be controlled to be at least 7, for example, by neutralization. Neutralization may be conducted by adding one or more bases which may lead to partial or complete neutralization of the ionic or latently ionic groups of the multistage emulsion polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The multistage emulsion polymer of the present invention is useful as a binder in many applications including, for example, wood coatings, metal protective coatings, architecture coatings, and traffic paints. The present invention also relates to an aqueous coating composition comprising the multistage emulsion polymer, typically in the form of an aqueous dispersion. The multistage emulsion polymer may be present, by weight based on the dry weight of the aqueous coating composition, in an amount of from 10% to 90%, from 20% to 80%, or from 30% to 60%.

The aqueous coating composition of the present invention may further comprise pigments. "Pigment" herein refers to a particulate inorganic material which is capable of materially contributing to the opacity or hiding capability of a coating. Such materials typically have a refractive index greater than 1.8. The pigments may include, for example, titanium dioxide ($TiO_2$), zinc oxide, iron oxide, zinc sulfide, barium sulfate, barium carbonate, or mixture thereof. In a preferred embodiment, pigment used in the present invention is $TiO_2$. $TiO_2$ typically exists in two crystal forms, anastase and rutile. $TiO_2$ may be also available in concentrated dispersion form. The aqueous coating composition may also comprise one or more extenders. "Extender" herein refers to a particulate material having a refractive index of less than or equal to 1.8 and greater than 1.3. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 10% to 80%, from 20% to 70%, or from 30% to 60%. PVC may be determined by the equation:

$$PVC = [Volume_{(Pigment+Extender)} / Volume_{(Pigment+Extender+Binder)}] \times 100\%.$$

The aqueous coating composition of the present invention may optionally comprise one or more photocrosslinkers in an amount without compromising DPUR properties, preferably, the aqueous coating composition comprises a substantial absence of a photocrosslinker. A substantial absence of a photocrosslinker herein refers to less than 0.6% of a photocrosslinker by weight based on the weight of the multistage emulsion polymer, for example, less than 0.5%, less than 0.4%, less than 0.3%, less than 0.2%, less than 0.1%, or even zero. The photocrosslinkers may include benzophenone (BP) derivatives such as benzophenone or a 4-substituted (para-) benzophenone, benzotriazole (BTA) derivatives such as benzotriazole, acylphosphine oxides, bisacylphosphine oxides, or mixtures thereof.

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The defoamer may be present, by weight based on the total dry weight of the aqueous coating composition, in an amount of from zero to 1.0%, from 0.1% to 0.6%, or from 0.2% to 0.4%.

The aqueous coating composition of the present invention may further comprise one or more thickeners. The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is a hydrophobically-modified hydroxy ethyl cellulose (HMHEC). The thickener may be present, by dry weight based on the total dry weight of the aqueous coating composition, in an amount of from zero to 5.0%, from 0.2% to 4.0%, or from 0.3% to 3%.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. The wetting agent may be present, by weight based on the total dry weight of the aqueous coating composition, in an amount of from zero to 5.0%, from 0.2% to 4.0%, or from 0.3% to 3.0%.

The aqueous coating composition of the present invention may further comprise one or more dispersants. The dispersants may include nonionic, anionic, or cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids (e.g., weight average molecular weight ranging from 1,000 to less than 50,000 as measured by gel permeation chromatography (GPC)), including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The dispersant may be present, by dry weight based on the total dry weight of the aqueous coating composition, in an amount of from zero to 10%, from 0.2% to 5.0%, or from 0.5% to 3.0%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescent may be present, by weight based on of the weight of the multistage emulsion polymer, in an amount of from zero to 35%, from 5% to 30%, or from 10% to 25%.

In addition to the components described above, the aqueous coating composition of the present invention may further comprise any one or combination of the following additives: buffers, neutralizers, anti-freezing agents, humectants, mildewcides, biocides, anti-skinning agents, colorants, flowing agents, anti-oxidants, plasticizers, leveling agents, thixotropic agents, adhesion promoters, and grind vehicles. These additives may be present in a combined amount of from zero to 20%, from 0.5% to 15%, or from 1.0% to 10%, by weight based on the dry weight of the aqueous coating composition.

The aqueous coating composition of the present invention may be prepared by admixing the multistage emulsion polymer with other optional components, e.g., pigments and/or extenders as described above. Components in the aqueous coating composition may be mixed in any order to provide the aqueous coating composition of the present invention. Any of the above-mentioned optional components may also be added to the composition during or prior to the mixing to form the aqueous coating composition. When the aqueous coating composition comprises pigment and/or extender, that is, a pigment formulation, the pigments and/or extenders are preferably mixed with the aqueous polymer dispersion as a dispersant to form a slurry of pigments and/or extender. The obtained admixture may be then subjected to shearing in a grinding or milling device as is well known in the pigment dispersion art. Such grinding or milling devices include roller mills, ball mills, bead mills, attrittor mills and include mills in which the admixture is continuously recirculated. The shearing of the admixture is continued for a time sufficient to disperse the pigment. The time sufficient to disperse the pigment typically depends on the nature of the pigment and the aqueous polymer dispersion as a dispersant and the grinding or milling device which is used and will be determined by the skilled practitioner.

The present invention also relates to a process for using the aqueous coating composition of the present invention. The process may comprise the following: applying the aqueous coating composition to a substrate, and drying, or allowing to dry, the applied aqueous coating composition. The present invention also relates to a method of producing a coating on a substrate, comprising: applying the substrate the aqueous coating composition of the present invention, and drying, or allowing to dry the aqueous coating composition to form the coating with improved dirt pick-up resistance (DPUR) as described above. "Improved DPUR" herein means that the aqueous coating composition of the present invention provides coatings with smaller $\Delta Y$ values after outdoor exposure than the same coating composition in the absence of the multistage emulsion polymer as described above ("Conventional Coating Composition"). For example, $\Delta Y$ values of the coatings made from the aqueous coating composition of the present invention may be at least 0.4 lower than that of Conventional Coating Composition, at least 0.5 lower, at least 0.6 lower, or at least 0.7 lower, after outdoor exposure for 1 month.

The aqueous coating composition of the present invention can be applied to, and adhered to, various substrates. Examples of suitable substrates include wood, metals, plastics, foams, stones, elastomeric substrates, glass, fabrics, concrete, or cementitious substrates. The coating composition, preferably comprising the pigment, is suitable for various applications such as marine and protective coatings, automotive coatings, traffic paint, Exterior Insulation and Finish Systems (EIFS), roof mastic, wood coatings, coil coatings, plastic coatings, powder coatings, can coatings, architectural coatings, and civil engineering coatings. The coating composition is particularly suitable for architectural coatings.

The aqueous coating composition of the present invention can be applied to a substrate by incumbent means including brushing, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition can dry, or allow to dry, to form a film (this is, coating) at room temperature (20-25° C.), or at an elevated temperature, for example, from 25 to 50° C.

EXAMPLES

Some embodiments of the invention will now be described in the following Examples, wherein all parts and percentages are by weight unless otherwise specified.

Onist ABS-15 surfactant, available from Shanghai Honest Chem. Co., Ltd., is a sodium dodecyl benzene sulfonate surfactant.

Polystep P-12A surfactant, available from Stepan, is polyethylene glycol monotridecyl ether phosphate.

tert-Butyl acrylate (TB A) and cyclohexyl methacrylate (CHMA) are available from BASF.

Butyl acrylate (BA), methyl methacrylate (MMA), 2-ethylhexyl acrylate (2-EHA), and methacrylic acid (MAA) are all available from Shanghai LangYuan Chemical Co., Ltd.

Silquest A-174 silane, available from Momentive, is gamma-Methacryloxypropyltrimethoxysilane.

N-Vinyl-2-pyrrolidone (NVP), n-dodecyl mercaptan (n-DDM), acrylamide (AM, 40%), ammonium persulfate (APS), tert-Butyl hydroperoxide (t-BHP), isoascorbic acid (IAA), ferrous sulfate, ethylene diamine tetra acetic acid (EDTA) sodium salt, lauryl methacrylate (LMA), and ammonia (25%-28%) are all available from Shanghai Chemical Reagent Co., Ltd.

Fox Tgs of homopolymers of the above monomers are given as follows,

| Monomer | BA | 2-EHA | CHMA | MAA | AM | LMA | MMA | TBA | Gamma-Methacryloxypropyl-trimethoxysilane | NVP |
|---|---|---|---|---|---|---|---|---|---|---|
| Fox Tg of homopolymer (° C.) | −54 | −85 | 92 | 185 | 165 | −65 | 105 | 41 | 55 | 54 |

The following standard analytical equipment and methods are used in the Examples.

Particle Size Measurement

The particle size of polymer particles in an aqueous dispersion was measured by using Brookhaven BI-90 Plus Particle Size Analyzer, which employs the technique of photon correlation spectroscopy (light scatter of sample particles). This method involved diluting 2 drops of an aqueous dispersion to be tested in 20 mL of 0.01 M sodium chloride (NaCl) solution, and further diluting the resultant mixture in a sample cuvette to achieve a desired count rate (K) (e.g., K ranging from 250 to 500 counts/sec for diameter in the range of 10-300 nm). Then the particle size of the aqueous polymer dispersion was measured and reported as a Z-average diameter by intensity.

MFFT

MFFT was determined by using Coesfeld MFFT instrument according to ASTM D2354-10e1 (2010) (Test method for minimum film formation temperature). MFFT was measured by casting a 75 μm wet film of an aqueous dispersion sample on a heating bar with a constant-temperature gradient from low to the high temperature end of the bar. After the film is dried, the lowest temperature on the bar at which the film is still continuous is recorded as the minimum film formation temperature.

Dirt Pick-Up Resistance (DPUR) Test

Paint panels for DPUR tests were prepared according to the following procedure:

(i) An exterior primer with the composition as shown in Table 3 below was applied onto cement panels by a roller with wet loading of 150 grams per square meter (g/m$^2$) and cured in a constant temperature room (CTR) (25° C. and 50% relative humidity (RH)) for 2 hours;

(ii) A test coating composition was brushed onto the above primer coated panels obtained from step (i) with wet loading of 200 g/m$^2$, and then dried in the CTR for 2 hours;

(iii) A second layer of the test coating composition was brushed onto the panel obtained from step (ii) with wet loading of 200 g/m$^2$; and (iv) The obtained paint panels were dried in the CTR for 1 day before conducting outdoor DPUR tests.

Initial Y* values of the above obtained paint panels were measured. Then these paint panels were subjected to outdoor exposure. The exposure direction was 45° south angle. After one or two months of exposure, appearance change of the panels was observed and final Y* values were recorded as $Y^*_{final}$. $Y^*_{initial}$ and $Y^*_{final}$ values were measured by a Spectro-guide Sphere Gloss Portable Spectrophotometers (BYK-Gardner). The reflection Y change, denoted as ΔY, was calculated according to the following equation:

$$\Delta Y = Y^*_{initial} - Y^*_{final}$$

The smaller ΔY value, the better DPUR property.

Durability Test

Paint panels for durability tests were prepared as follows:

A test coating composition was first added 4% of organic phthalo blue colorant (888-7214 COLORTREND PHTHALO BLUE E), by weight based on the total weight of the test coating composition. The obtained blue coating compositions were applied onto Q-panels with a wet film thickness of 150 μm, and then dried in a CTR (25° C. and 50% RH) for 7 days. The obtained blue paint panels were evaluated by using a Spectro-guide Sphere Gloss Portable Spectrophotometers (BYK-Gardner), and $L^*_{initial}$, $a^*_{initial}$, and $b^*_{initial}$ values were recorded.

The blue paint panels were then put into Accelerated Weathering Tester (Model QUV/SE, Q-Lab Corporation) for quick ultraviolet (QUV) testing. After exposure to ultraviolet A (UVA wavelength: 340 nm) for 1,000 hours, final L*, a*, and b* values were recorded as $L^*_{final}$, $a^*_{final}$, and $b^*_{final}$, respectively. ΔE values, indicating durability of the samples, were calculated according to the below formula, $$\Delta E = \sqrt{(L^*_{initial} - L^*_{final})^2 + (a^*_{initial} - a^*_{final})^2 + (b^*_{initial} - b^*_{final})^2}$$

The smaller ΔE value, the better durability.

Example (Ex) 1

Firstly, a monomer emulsion 1 # (ME1) was prepared by mixing deionized (DI) water (278 g), AM (28.78 g, 40%), MAA (29.69 g), n-DDM (1.28 g), MMA (875.26 g), 2-EHA (365.96 g), and ABS-15 surfactant (58.73 g, 16.33%). A monomer emulsion 2 # (ME2) was prepared by mixing DI water (67.52 g), 2-EHA (166.93 g), MMA (136.16 g), NVP (15.99 g), A-174 (1.60 g), ABS-15 surfactant (9.80 g, 16.33%), and P-12A surfactant (19.17 g, 25%).

Secondly, in a one-gallon vessel equipped with a reflux condenser and a stirrer, DI water (837.61 g) was added at an agitation rate of 130 rpm. Meanwhile, the temperature of the reaction vessel was raised to 91° C. Then A-19 surfactant (12.14 g, 19%) and a buffer solution of sodium carbonate (Na$_2$CO$_3$) (2.08 g in 12.82 g DI water) was introduced into the reaction vessel.

Thirdly, ME1 (51.7 g) and an initiator solution of APS (3.41 g in 17.09 g DI water) were injected into the reaction vessel. The reaction mixture was being held at a temperature between 80 and 95° C. for 5 minutes (min). Thereafter, the remainder of ME1 was added into the reaction vessel over the span of 72 min. After completing the feed of ME1, ME2 was added into the reaction vessel over the span of 18 min. During the addition of ME1 and ME2, another shot of an initiator solution of APS (1.45 g in 100 g DI water) and a buffer solution of Na$_2$CO$_3$ (0.79 g in 100 g DI water) were co-fed into the reaction vessel over the span of 90 min. The reaction temperature was being held at somewhere between 87 to 89° C. After the above mixing steps were completed, the reaction vessel was cooled down. While cooling the contents of the reaction vessel to room temperature, an initial reductant solution (0.0164 g ferrous sulfate and 0.0164 g EDTA sodium salt in 6.78 g DI water), a secondary reductant solution (0.62 g IAA in 18.8 g DI water), and an initiator solution of t-BHP (1.12 g 70% aqueous solution in 18.8 g DI water), were injected into the reaction vessel when the temperature had dropped to 70° C. Finally, an adjustable amount of ammonia solution was added to the resultant dispersion to keep the pH between 7.5 and 8.5 when the temperature had reached 50° C. Thus, Ex 1 was obtained.

Comparative (Comp) Ex 1A

An aqueous dispersion of Comp Ex 1A was prepared as in Ex 1, except ME1 and ME2 were prepared as follows, Firstly, ME1 was prepared by mixing DI water (278 g), AM (28.78 g, 40%), MAA (29.69 g), n-DDM (1.28 g), MMA (875.26 g), 2-EHA (365.96 g), and ABS-15 surfactant (58.73 g, 16.33%). ME2 was prepared by mixing DI water (67.52 g), 2-EHA (166.93 g), MMA (152.18 g), A-174 (1.60 g), ABS-15 surfactant (9.80 g, 16.33%), and P-12A surfactant (19.17 g, 25%).

Comp Ex 2A

An aqueous dispersion of Comp Ex 2A was prepared as in Ex 1, except ME1 and ME2 were prepared as follows, ME1 was prepared by mixing DI water (278 g), AM (28.78 g, 40%), MAA (29.69 g), n-DDM (1.28 g), MMA (554.88 g), CHMA (319.73 g), 2-EHA (365.96 g), and ABS-15 surfactant (58.73 g, 16.33%). ME2 was prepared by mixing DI water (67.52 g), 2-EHA (166.93 g), MMA (152.18 g), A-174 (1.60 g), ABS-15 surfactant (9.80 g, 16.33%), and P-12A surfactant (19.17 g, 25%).

Ex 2

An aqueous dispersion of Ex 2 was prepared as in Ex 1, except ME1 and ME2 were prepared as follows, ME1 was prepared by mixing DI water (278 g), AM (28.78 g, 40%), MAA (29.69 g), n-DDM (1.28 g), MMA (554.88 g), CHMA (319.73 g), 2-EHA (365.96 g), and ABS-15 surfactant (58.73 g, 16.33%). ME2 was prepared by mixing DI water (67.52 g), 2-EHA (166.93 g), MMA (136.15 g), NVP (15.99 g), A-174 (1.60 g), ABS-15 surfactant (9.80 g, 16.33%), and P-12A surfactant (19.17 g, 25%).

Comp Ex E One-Stage Polymerization

A monomer emulsion (ME) was prepared by mixing DI water (325 g), AM (28.78 g, 40%), MAA (29.69 g), n-DDM (1.28 g), MMA (1027.44 g), A-174 (1.6 g), 2-EHA (532.89 g), ABS-15 surfactant (68.52 g, 16.33%), and P-12A surfactant (19.17 g, 25%).

In a one-gallon vessel equipped with a reflux condenser and a stirrer, DI water (837.61 g) was added at an agitation rate of 130 rpm. Meanwhile, the temperature of the reaction vessel was raised to 91° C. Then A-19 surfactant (12.14 g, 19%) and a buffer solution of $Na_2CO_3$ (2.08 g in 12.82 g DI water) was introduced into the reaction vessel.

The above obtained ME (51.7 g) and an initiator solution of APS (3.41 g in 17.09 g DI water) were injected into the reaction vessel. The reaction mixture was being held at a temperature between 80 and 95° C. for 5 minutes. Thereafter, the remainder of ME was added into the reaction vessel over the span of 90 minutes. During the addition of ME, another shot of an initiator solution of APS (1.45 g in 100 g DI water) and a buffer solution of $Na_2CO_3$ (0.79 g in 100 g DI water) were co-fed into the reaction vessel over the span of 90 minutes. The reaction temperature was being held at somewhere between 87 to 89° C. After the above mixing steps were completed, the reaction vessel was cooled down. While cooling the contents of the reaction vessel to room temperature, an initial reductant solution (0.0164 g ferrous sulfate and 0.0164 g EDTA sodium salt in 6.78 g DI water), a secondary reductant solution (0.62 g IAA in 18.8 g DI water), and an initiator solution of t-BHP (1.12 g 70% aqueous solution in 18.8 g DI water), were injected into the reaction vessel when the temperature had dropped to 70° C. Finally, an adjustable amount of ammonia solution was added to the resultant dispersion to keep the pH between 7.5 and 8.5 when the temperature had reached 50° C. Thus, Comp Ex E was obtained.

Comp Ex F One-Stage Polymerization

An aqueous dispersion of Comp Ex F was prepared as Comp Ex E, except the monomer emulsion used for preparing the emulsion polymer was prepared by mixing DI water (325 g), AM (28.78 g, 40%), MAA (29.69 g), n-DDM (1.28 g), MMA (1011.42 g), A-174 (1.6 g), NVP (15.99 g), 2-EHA (532.89 g), ABS-15 surfactant (68.52 g, 16.33%), and P-12A surfactant (19.17 g, 25%).

Comp Ex G

An aqueous dispersion of Comp Ex G was prepared as in Ex 1, except ME1 and ME2 were prepared as follows:

ME1 was prepared by mixing DI water (165 g), AM (27.98 g, 40%), MAA (29.07 g), n-DDM (1.28 g), MMA (532.63 g), 2-EHA (228.73 g), and ABS-15 surfactant (34.23 g, 16.33%). ME2 was prepared by mixing DI water (181.45 g), 2-EHA (417.33 g), MMA (382.85 g), A-174 (1.60 g), ABS-15 surfactant (34.23 g, 16.33%), and P-12A surfactant (19.17 g, 25%).

Comp Ex H

An aqueous dispersion of Comp Ex H was prepared as in Ex 1, except ME1 and ME2 were prepared as follows, ME1 was prepared by mixing DI water (165 g), AM (27.98 g, 40%), MAA (29.07 g), n-DDM (1.28 g), MMA (532.63 g), 2-EHA (228.73 g), and ABS-15 surfactant (34.23 g, 16.33%). ME2 was prepared by mixing DI water (181.45 g), 2-EHA (417.33 g), MMA (366.83 g), NVP (15.99 g), A-174 (1.60 g), ABS-15 surfactant (34.23 g, 16.33%), and P-12A surfactant (19.17 g, 25%).

Comp Ex I

An aqueous dispersion of Comp Ex I was prepared as in Ex 1, except ME1 and ME2 were prepared as follows, ME1 was prepared by mixing DI water (278 g), AM (28.78 g, 40%), MAA (29.69 g), n-DDM (1.28 g), MMA (811.19 g), BA (430.60 g), and ABS-15 surfactant (58.73 g, 16.33%). ME2 was prepared by mixing DI water (67.52 g), BA (199.23 g), MMA (120.14 g), A-174 (1.60 g), ABS-15 surfactant (9.80 g, 16.33%), and P-12A surfactant (19.17 g, 25%).

Comp Ex J

An aqueous dispersion of Comp Ex J was prepared as in Ex 1, except ME1 and ME2 were prepared as follows, ME1 was prepared by mixing DI water (278 g), AM (28.78 g, 40%), MAA (29.69 g), n-DDM (1.28 g), MMA (811.19 g), BA (430.60 g), and ABS-15 surfactant (58.73 g, 16.33%). ME2 was prepared by mixing DI water (67.52 g), BA (199.23 g), MMA (104.12 g), NVP (15.99 g), A-174 (1.60 g), ABS-15 surfactant (9.80 g, 16.33%), and P-12A surfactant (19.17 g, 25%).

Comp Ex K

An aqueous dispersion of Comp Ex K was prepared as in Ex 1, except ME1 and ME2 were prepared as follows, ME1 was prepared by mixing DI water (278 g), AM (28.78 g, 40%), MAA (29.69 g), n-DDM (1.28 g), MMA (859.24 g), NVP (15.99 g), 2-EHA (365.96 g), and ABS-15 surfactant (58.73 g, 16.33%). ME2 was prepared by mixing DI water (67.52 g), 2-EHA (166.93 g), MMA (152.18 g), A-174 (1.60 g), ABS-15 surfactant (9.80 g, 16.33%), and P-12A surfactant (19.17 g, 25%).

Ex 9

An aqueous dispersion of Ex 9 was prepared as in Ex 1, except ME1 and ME2 were prepared as follows, ME1 was prepared by mixing DI water (278 g), AM (28.78 g, 40%), MAA (29.69 g), n-DDM (1.28 g), MMA (875.26 g), 2-EHA (365.96 g), and ABS-15 surfactant (58.73 g, 16.33%). ME2 was prepared by mixing DI water (67.52 g), 2-EHA (166.93 g), MMA (72.08 g), NVP (79.95 g), A-174 (1.60 g), ABS-15 surfactant (9.80 g, 16.33%), and P-12A surfactant (19.17 g, 25%).

Comp Ex 3A

An aqueous dispersion of Comp Ex 3A was prepared as in Ex 1, except ME1 and ME2 were prepared as follows, ME1 was prepared by mixing DI water (308 g), AM (28.78 g, 40%), MAA (29.69 g), n-DDM (1.28 g), MMA (989.71 g), 2-EHA (411.7 g), and ABS-15 surfactant (62.81 g, 16.54%). ME2 was prepared by mixing DI water (32 g), 2-EHA (83.47 g), MMA (75.29 g), A-174 (1.60 g), ABS-15 surfactant (4.84 g, 16.54%), and P-12A surfactant (19.17 g, 25%).

Ex 3

An aqueous dispersion of Ex 3 was prepared as in Ex 1, except ME1 and ME2 were prepared as follows, ME1 was prepared by mixing DI water (308 g), AM (28.78 g, 40%), MAA (29.69 g), n-DDM (1.28 g), MMA (989.71 g), 2-EHA (411.7 g), and ABS-15 surfactant (62.81 g, 16.54%). ME2 was prepared by mixing DI water (32 g), 2-EHA (83.47 g), MMA (59.27 g), NVP (15.99 g), A-174 (1.60 g), ABS-15 surfactant (4.84 g, 16.54%), and P-12A surfactant (19.17 g, 25%).

Comp Ex 4A

An aqueous dispersion of Comp Ex 4A was prepared as in Ex 1, except ME1 and ME2 were prepared as follows,
ME1 was prepared by mixing DI water (243 g), AM (28.82 g, 40%), MAA (29.73 g), n-DDM (1.28 g), MMA (760.7 g), 2-EHA (320.22 g), and ABS-15 surfactant (50.72 g, 16.54%). ME2 was prepared by mixing DI water (102.52 g), 2-EHA (250.39 g), MMA (229.08 g), A-174 (1.60 g), ABS-15 surfactant (16.91 g, 16.54%), and P-12A surfactant (19.17 g, 25%).

Ex 4

An aqueous dispersion of Ex 4 was prepared as in Ex 1, except ME1 and ME2 were prepared as follows,
ME1 was prepared by mixing DI water (243 g), AM (28.82 g, 40%), MAA (29.73 g), n-DDM (1.28 g), MMA (760.7 g), 2-EHA (320.22 g), and ABS-15 surfactant (50.72 g, 16.54%). ME2 was prepared by mixing DI water (102.52 g), 2-EHA (250.39 g), MMA (213.08 g), NVP (15.99 g), A-174 (1.60 g), ABS-15 surfactant (16.91 g, 16.54%), and P-12A surfactant (19.17 g, 25%).

Comp Ex 5A

An aqueous dispersion of Comp Ex 5A was prepared as in Ex 1, except ME1 and ME2 were prepared as follows,
ME1 was prepared by mixing DI water (210 g), AM (28.78 g, 40%), MAA (29.74 g), n-DDM (1.28 g), MMA (646.16 g), 2-EHA (274.47 g), and ABS-15 surfactant (43.47 g, 16.54%). ME2 was prepared by mixing DI water (135 g), 2-EHA (333.86 g), MMA (305.96 g), A-174 (1.60 g), ABS-15 surfactant (24.15 g, 16.54%), and P-12A surfactant (19.17 g, 25%).

Ex 5

An aqueous dispersion of Ex 5 was prepared as in Ex 1, except ME1 and ME2 were prepared as follows,
ME1 was prepared by mixing DI water (210 g), AM (28.78 g, 40%), MAA (29.74 g), n-DDM (1.28 g), MMA (646.16 g), 2-EHA (274.47 g), and ABS-15 surfactant (43.47 g, 16.54%). ME2 was prepared by mixing DI water (135 g), 2-EHA (333.86 g), MMA (289.94 g), A-174 (1.60 g), NVP (15.99 g), ABS-15 surfactant (24.15 g, 16.54%), and P-12A surfactant (19.17 g, 25%).

Comp Ex O

An aqueous dispersion of Comp Ex O was prepared as in Ex 1, except ME1 and ME2 were prepared as follows,
ME1 was prepared by mixing DI water (278 g), AM (28.78 g, 40%), MAA (29.69 g), n-DDM (1.28 g), MMA (849.63 g), 2-EHA (391.64 g), and ABS-15 surfactant (58.73 g, 16.33%). ME2 was prepared by mixing DI water (67.52 g), 2-EHA (147.03 g), MMA (172.04 g), A-174 (1.60 g), ABS-15 surfactant (9.80 g, 16.33%), and P-12A surfactant (19.17 g, 25%).

Comp Ex P

An aqueous dispersion of Comp Ex P was prepared as in Ex 1, except ME1 and ME2 were prepared as follows,
ME1 was prepared by mixing DI water (278 g), AM (28.78 g, 40%), MAA (29.69 g), n-DDM (1.28 g), MMA (849.63 g), 2-EHA (391.64 g), and ABS-15 surfactant (58.73 g, 16.33%). ME2 was prepared by mixing DI water (67.52 g), 2-EHA (147.03 g), MMA (156.02 g), NVP (15.99 g), A-174 (1.60 g), ABS-15 surfactant (9.80 g, 16.33%), and P-12A surfactant (19.17 g, 25%).

Comp Ex 6A

An aqueous dispersion of Comp Ex 6A was prepared as in Ex 1, except ME1 and ME2 were prepared as follows,
ME1 was prepared by mixing DI water (278 g), AM (28.78 g, 40%), MAA (29.69 g), n-DDM (1.28 g), MMA (834.26 g), BA (304.63 g), 2-EHA (102.52 g), and ABS-15 surfactant (58.73 g, 16.33%). ME2 was prepared by mixing DI water (67.52 g), 2-EHA (25.63 g), BA (170.31 g), MMA (123.34 g), A-174 (1.60 g), ABS-15 surfactant (9.80 g, 16.33%), and P-12A surfactant (19.17 g, 25%).

Ex 6

An aqueous dispersion of Ex 6 was prepared as in Ex 1, except ME1 and ME2 were prepared as follows,
ME1 was prepared by mixing DI water (278 g), AM (28.78 g, 40%), MAA (29.69 g), n-DDM (1.28 g), MMA (834.26 g), BA (304.63 g), 2-EHA (102.52 g), and ABS-15 surfactant (58.73 g, 16.33%). ME2 was prepared by mixing DI water (67.52 g), 2-EHA (25.63 g), BA (170.31 g), MMA (107.32 g), NVP (15.99 g), A-174 (1.60 g), ABS-15 surfactant (9.80 g, 16.33%), and P-12A surfactant (19.17 g, 25%).

Comp Ex 7A

An aqueous dispersion of Comp Ex 7A was prepared as in Ex 1, except ME1 and ME2 were prepared as follows,
ME1 was prepared by mixing DI water (278 g), AM (28.78 g, 40%), MAA (29.69 g), n-DDM (1.28 g), MMA (849.64 g), BA (186.38 g), 2-EHA (205.04 g), and ABS-15 surfactant (58.73 g, 16.33%). ME2 was prepared by mixing DI water (67.52 g), 2-EHA (51.26 g), BA (141.39 g), MMA (126.54 g), A-174 (1.60 g), ABS-15 surfactant (9.80 g, 16.33%), and P-12A surfactant (19.17 g, 25%).

Ex 7

An aqueous dispersion of Ex 7 was prepared as in Ex 1, except ME1 and ME2 were prepared as follows,
ME1 was prepared by mixing DI water (278 g), AM (28.78 g, 40%), MAA (29.69 g), n-DDM (1.28 g), MMA (849.64 g), BA (186.38 g), 2-EHA (205.04 g), and ABS-15 surfactant (58.73 g, 16.33%). ME2 was prepared by mixing DI water (67.52 g), 2-EHA (51.26 g), BA (141.39 g), MMA (110.52 g), NVP (15.99 g), A-174 (1.60 g), ABS-15 surfactant (9.80 g, 16.33%), and P-12A surfactant (19.17 g, 25%).

Comp Ex S

An aqueous dispersion of Comp Ex S was prepared as in Ex 1, except ME1 and ME2 were prepared as follows,
ME1 was prepared by mixing DI water (278 g), AM (28.78 g, 40%), MAA (29.69 g), n-DDM (1.28 g), MMA (834.26 g), BA (304.63 g), LMA (102.52 g), and ABS-15 surfactant (58.73 g, 16.33%). ME2 was prepared by mixing DI water (67.52 g), LMA (25.63 g), BA (170.31 g), MMA (123.34 g), A-174 (1.60 g), ABS-15 surfactant (9.80 g, 16.33%), and P-12A surfactant (19.17 g, 25%).

Comp Ex T

An aqueous dispersion of Comp Ex T was prepared as in Ex 1, except ME1 and ME2 were prepared as follows, ME1 was prepared by mixing DI water (278 g), AM (28.78 g, 40%), MAA (29.69 g), n-DDM (1.28 g), MMA (834.26 g), BA (304.63 g), LMA (102.52 g), and ABS-15 surfactant (58.73 g, 16.33%). ME2 was prepared by mixing DI water (67.52 g), LMA (25.63 g), BA (170.31 g), MMA (107.32 g), NVP (15.99 g), A-174 (1.60 g), ABS-15 surfactant (9.80 g, 16.33%), and P-12A surfactant (19.17 g, 25%).

Comp Ex 8A

An aqueous dispersion of Comp Ex 8A was prepared as in Ex 1, except ME1 and ME2 were prepared as follows, ME1 was prepared by mixing DI water (278 g), AM (28.78 g, 40%), MAA (29.69 g), n-DDM (1.28 g), MMA (606.15 g), BA (430.60 g), CHMA (205.04 g), and ABS-15 surfactant (58.73 g, 16.33%). ME2 was prepared by mixing DI water (67.52 g), CHMA (51.26 g), BA (199.23 g), MMA (68.88 g), A-174 (1.60 g), ABS-15 surfactant (9.80 g, 16.33%), and P-12A surfactant (19.17 g, 25%).

Ex 8

An aqueous dispersion of Ex 8 was prepared as in Ex 1, except ME1 and ME2 were prepared as follows, ME1 was prepared by mixing DI water (278 g), AM (28.78 g, 40%), MAA (29.69 g), n-DDM (1.28 g), MMA (606.15 g), BA (430.60 g), CHMA (205.04 g), and ABS-15 surfactant (58.73 g, 16.33%). ME2 was prepared by mixing DI water (67.52 g), CHMA (51.26 g), BA (199.23 g), MMA (52.86 g), NVP (15.99 g), A-174 (1.60 g), ABS-15 surfactant (9.80 g, 16.33%), and P-12A surfactant (19.17 g, 25%).

Properties of the aqueous dispersions of emulsion polymers prepared above are given in Table 1. The multistage emulsion polymers of Exs 1-9 provided comparable MFFT as compared to the same emulsion polymers free of structural units of NVP. These aqueous emulsion polymer dispersions were used as binders in preparing coating compositions below.

TABLE 1

Compositions and properties of aqueous dispersions

| | pH | Solids content[1], % | Particle size, nm | MFFT, °C. | $T_g^2$ (multistage or one-stage emulsion polymer), °C. |
|---|---|---|---|---|---|
| Comp Ex 1A | 7.98 | 48.96 | 110 | 50 | 10.91 |
| Ex 1 | 7.76 | 49 | 113 | 49 | 10.58 |
| Comp Ex 2A | 7.42 | 49.12 | 111 | 43 | 9.40 |
| Ex 2 | 6.94 | 48.96 | 108 | 44.4 | 9.07 |
| Comp Ex E | 8.05 | 48.58 | 109 | 32 | 10.91 |
| Comp Ex F | 8.04 | 48.76 | 115 | 32 | 10.58 |
| Comp Ex G | 7.71 | 49.16 | 112 | 36 | −3.53 |
| Comp Ex H | 7.50 | 48.75 | 118 | 36 | −3.83 |
| Comp Ex I | 8.3 | 49.17 | 119 | 39 | 22.20 |
| Comp Ex J | 8.37 | 48.81 | 119 | 34 | 21.84 |
| Comp Ex K | 8.17 | 49.02 | 119 | 50 | 10.58 |
| Ex 9 | 8.84 | 48.46 | 115 | 50 | 9.26 |
| Comp Ex 3A | 8.3 | 48.82 | 107 | 49.6 | 16.07 |
| Ex 3 | 8.24 | 50.75 | 115 | 50.0 | 15.73 |
| Comp Ex 4A | 8.08 | 48.75 | 109 | 45.2 | 5.94 |
| Ex 4 | 7.92 | 48.79 | 114 | 44.1 | −22.65 |
| Comp Ex 5A | 7.99 | 48.67 | 110 | 41.3 | 1.13 |
| Ex 5 | 7.85 | 48.34 | 113 | 39.3 | 78.83 |
| Comp Ex O | 8.15 | 48.55 | 109 | 42.3 | 10.14 |
| Comp Ex P | 8.15 | 48.53 | 108 | 40.9 | 9.81 |
| Comp Ex 6A | 8.38 | 48.28 | 114 | 40.4 | 19.72 |
| Ex 6 | 8.26 | 47.9 | 113 | 38.2 | 19.36 |
| Comp Ex 7A | 8.15 | 48.48 | 111 | 41.9 | 16.50 |
| Ex 7 | 8.18 | 48.55 | 110 | 37.3 | 16.16 |
| Comp Ex S | 8.23 | 48.24 | 110 | 44.6 | 23.26 |
| Comp Ex T | 8.4 | 48.57 | 110 | 42.9 | 22.90 |
| Comp Ex 8A | 8.22 | 48.45 | 111 | 32.6 | 20.89 |
| Ex 8 | 8.22 | 48.51 | 112 | 31.0 | 20.53 |

[1]Solids content was measured by weighting 0.7 ± 0.1 g of a polymer emulsion sample (wet weight of the sample is denoted as "W1"), putting the sample into an aluminum pan (weight of aluminum pan is denoted as "W2") in an oven at 150° C. for 25 min, and then cooling and weighting the aluminum pan with the dried sample with total weight denoted as "W3". "W3 − W2" refers to the dry or solids weight of the sample. Solids content is calculated by (W3 − W2)/W1*100%.
[2]Tg was calculated by the Fox equation.

Coating Compositions

Coating compositions were prepared through a two-stage process, based on formulations given in Table 2. Firstly, all ingredients in the grind stage were added sequentially and mixed using a high speed disperser at 1,000 revolutions per minute (rpm) for 30 minutes to get a well dispersed slurry. Then ingredients in the letdown stage were added sequentially into the slurry. Types of binders (i.e., the as prepared aqueous dispersions) used for each coating composition are given in Tables 4 and 5. The obtained coating compositions each had a PVC of 40.33%, volume solids of 38.71%, and weight solids of 53.76%.

TABLE 2

Coating compositions

| Raw material | Supplier | gram |
|---|---|---|
| Grind | | |
| Water | | 70.00 |
| Propylene glycol as a solvent | Sinopharm Chemical Reagent Co., Ltd. | 7.5 |
| Natrosol 250 HBR (a HEC thickener) | Ashland Aquaion Company | 1.00 |
| AMP-95 neutralizing agent | ANGUS Chemical Company | 1.00 |
| OROTAN ™ CA-2500 dispersant | The Dow Chemical Company | 7.00 |
| ECOSURF ™ EF-106 surfactant | | 1.25 |
| ROCIMA 361 biocide | DuPont Company | 3.50 |
| Nopco NXZ defoamer | San Nopco Limited | 0.50 |
| Ti-Pure R-706 titanium dioxide pigment | DuPont Company | 80.00 |
| Minex 4 Extender | Guangfu Building Materials Group (China) | 18.00 |
| CC-700 calcium carbonate extender | | 70.00 |
| End Grind | | |
| Letdown | | |
| Binder | The Dow Chemical Company | 205.00 |
| ROPAQUE Ultra E opaque polymer (extender) | | 12.50 |
| Texanol coalescent | Eastman Chemical Company | 25.10 |

TABLE 2-continued

Coating compositions

| Raw material | Supplier | gram |
|---|---|---|
| ACRYSOL ™ RM-8W HEUR thickener | The Dow Chemical Company | 0.50 |
| ACRYSOL RM-2020 NPR HEUR thickener | | 1.50 |
| Water | | 2.00 |
| End Letdown | | |
| Total | | 506.35 |

*OROTAN, ECOSURF, and ACRYSOL are trademarks of The Dow Chemical Company.

The obtained coating compositions were evaluated in two groups (Group I and Group II) for DPUR properties according to the test method described above and results are summarized in Tables 4 and 5, respectively. In the DPUR tests, coating compositions in each of Group I and Group II were tested together by exposing to the same outdoor conditions. When preparing paint panels for the DPUR tests, the exterior primer was used and prepared according to the same procedure as preparing the coating compositions above, based on the primer composition given in Table 3.

TABLE 3

Exterior Primer Composition

| Raw material | Supplier | gram |
|---|---|---|
| Grind | | |
| DI Water | | 160.0 |
| Propylene glycol | The Dow Chemical Company | 15.0 |
| CELLOSIZE ™ QP 15000H HEC thickener | | 2.0 |
| Ammonia (28%) | Sinopharm Chemical Reagent Co., Ltd. | 1.5 |
| OROTAN 963 polyacid dispersant (35%) | The Dow Chemical Company | 7.0 |
| TRITON EF-106 surfactant | | 2.0 |
| Disperlair CF-246 defoamer | NOPCO | 1.5 |
| Lomon R-996 TiO2 | Lomon | 30.0 |
| CC-800 calcium carbonate (800 mesh) | Guangfu Building Materials Group (China) | 280.0 |
| Talc 800 Talc (800 mesh) | | 100.0 |
| Grind Sub-total | | 599.0 |
| Letdown | | |
| PRIMAL ™ DC-420 (styrene-acrylic emulsion) | The Dow Chemical Company | 230.0 |
| Texanol coalescent | Eastman | 23.0 |
| Disperlair CF-246 defoamer | NOPCO | 1.5 |
| ACRYSOL TT-935 HASE thickener | The Dow Chemical Company | 4.0 |
| Water | | 141.0 |
| KATHON LXE biocide | DuPont Company | 2.0 |
| Total | | 1000.5 |

*CELLOSIZE and PRIMAL are trademarks of The Dow Chemical Company.

Table 4 gives DPUR properties after outdoor exposure and durability properties after QUV tests for the coating compositions in Group I. As shown in Table 4, the multi-stage polymers in Exs 1, 2 and 9 provided coatings with improved DPUR properties, as indicated by ΔY values at least 0.4 lower than those of Comp Ex 1A, 2A, and 1A, respectively. In contrast, addition of NVP in the preparation of the one-stage polymer resulted in decreased DPUR performance of coatings comprising thereof (Comp Ex F) as compared to that of Comp Ex E. As compared to Comp Ex G, the multistage polymer comprising structural units of NVP at a stage ratio of 50:50 (Comp Ex H) didn't show improvement on DPUR of coatings comprising thereof. The multistage polymer free of structural units of NVP in the second stage (Comp Ex K) provided no improvement on DPUR properties of coatings over Comp Ex 1A. The combination of NVP into the multistage polymer of Comp Ex J failed to provide coatings with improved DPUR as compared to Comp Ex I. In addition, Exs 1-2 and 9 demonstrated comparable durability properties as compared to the comparative coating compositions (Comp Ex 1A and 2A).

TABLE 4

Group I coating formulations and properties

| Coating | Binder | Stage ratio[1] | Tg gap[2], ° C. | DPUR (ΔY[a]) | Durability (ΔE) |
|---|---|---|---|---|---|
| Coating 1A | Comp Ex 1A | 80:20 | 47.02 | 5.81 (12.96[b]) | 7.8 |
| Coating 1 | Ex 1 | 80:20 | 48.28 | 5.28 (10.6[b]) | 8.0 |
| Coating 2A | Comp Ex 2A | 80:20 | 44.98 | 16.73[b] | 5.7 |
| Coating 2 | Ex 2 | 80:20 | 46.24 | 14.46[b] | 5.6 |
| Coating E | Comp Ex E | one stage | 0 | 7.20 | NA |
| Coating F | Comp Ex F | one stage | 0 | 7.87 | NA |
| Coating G | Comp Ex G | 50:50 | 47.62 | 6.86 | NA |
| Coating H | Comp Ex H | 50:50 | 48.13 | 6.68 | NA |
| Coating I | Comp Ex I | 80:20 | 44.81 | 7.17 | NA |
| Coating J | Comp Ex J | 80:20 | 46.21 | 6.99 | NA |
| Coating K | Comp Ex K | 80:20 | 46.57 | 6.06 | 6.6 |
| Coating 9 | Ex 9 | 80:20 | 53.19 | 5.07 | 7.6 |

[a]ΔY after 1-month outdoor exposure unless otherwise stated.
[b]ΔY after 2-month outdoor exposure.
[1]Stage ratio refers to the weight ratio of monomers in the first stage to monomers in the second stage.
[2]Tg gap refers to the Tg difference between the first polymer and the second polymer.

Table 5 gives DPUR properties for the coating compositions in Group II. As shown in Table 5, the aqueous multistage polymer dispersions of Exs 3-8 provided coatings with improved DPUR properties as indicated by ΔY values at least 0.4 lower than those of Comp Exs 3A, 4A, 5A, 6A, 7A, and 8A, respectively. In contrast, the addition of NVP into the multistage polymers of Comp Exs P and T didn't improve coatings' DPUR properties as compared to those of Comp Exs O and S, respectively.

TABLE 5

Group II coating formulations and properties

| Coating composition | Binder | Stage ratio[1] | Tg gap[2], ° C. | DPUR (ΔY, 1 month) |
|---|---|---|---|---|
| Coating 3A | Comp Ex 3A | 90:10 | 47.01 | 5.6 |
| Coating 3 | Ex 3 | 90:10 | 49.51 | 4.3 |
| Coating 4A | Comp Ex 4A | 70:30 | 47.15 | 8.3 |
| Coating 4 | Ex 4 | 70:30 | 47.99 | 6.7 |
| Coating 5A | Comp Ex 5A | 60:40 | 47.36 | 11.6 |
| Coating 5 | Ex 5 | 60:40 | 47.99 | 9.6 |
| Coating O | Comp Ex O | 80:20 | 31.84 | 7.2 |
| Coating P | Comp Ex P | 80:20 | 33.21 | 6.9 |
| Coating 6A | Comp Ex 6A | 80:20 | 45.20 | 9.4 |
| Coating 6 | Ex 6 | 80:20 | 46.56 | 9.0 |
| Coating 7A | Comp Ex 7A | 80:20 | 44.52 | 8.8 |
| Coating 7 | Ex 7 | 80:20 | 45.86 | 8.4 |
| Coating S | Comp Ex S | 80:20 | 46.25 | 7.8 |
| Coating T | Comp Ex T | 80:20 | 47.64 | 8.0 |
| Coating 8A | Comp Ex 8A | 80:20 | 44.43 | 14.5 |
| Coating 8 | Ex 8 | 80:20 | 45.82 | 13.5 |

[1]Stage ratio refers to the weight ratio of monomers in the first stage to monomers in the second stage.
[2]Tg gap refers to the Tg difference between the first polymer and the second polymer.

What is claimed is:

1. A multistage emulsion polymer comprising a first polymer and a second polymer,
wherein the multistage emulsion polymer comprises, by weight based on the weight of the multistage emulsion polymer, from 0.1% to 10% of structural units of a nitrogen-containing heterocyclic monomer, and 5% or more of structural units of a cycloalkyl (meth) acrylate, a $C_6$-$C_{10}$ alkyl (meth) acrylate, or mixtures thereof;
wherein the second polymer comprises structural units of the nitrogen-containing heterocyclic monomer;
wherein Tg of the first polymer is at least 35° C. higher than that of the second polymer;
wherein the weight ratio of the first polymer to the second polymer is in the range of from 55:45 to 95:5.

2. The multistage emulsion polymer of claim 1, wherein the nitrogen-containing heterocyclic monomer is an ethylenically unsaturated imidazole, imidazoline, amidine, pyridine, pyrrole, pyrrolidine, pyrrolidone, or caprolactam; or combinations thereof.

3. The multistage emulsion polymer of claim 1, wherein the nitrogen-containing heterocyclic monomer is a vinylpyrrolidone.

4. The multistage emulsion polymer of claim 1, wherein the multistage emulsion polymer comprises structural units of cyclohexyl (meth) acrylate, 2-ethylhexyl (meth) acrylate, or mixtures thereof.

5. The multistage emulsion polymer of claim 1, wherein the second polymer comprises, by weight based on the weight of the second polymer, from 0.2% to 80% of structural units of the nitrogen-containing heterocyclic monomer.

6. The multistage emulsion polymer of claim 1, wherein the weight ratio of the first polymer to the second polymer in the range of from 60:40 to 90:10.

7. The multistage emulsion polymer of claim 1, further comprising structural units of a monoethylenically unsaturated functional monomer carrying at least one functional group selected from a carboxyl, carboxylic anhydride, sulfonic acid, amide, sulfonate, phosphoric acid, phosphonate, phosphate, or hydroxyl group, a salt thereof, or combinations thereof; and optionally structural units of an additional monoethylenically unsaturated nonionic monomer.

8. A process of preparing the multistage emulsion polymer of claim 1 by multistage free-radical polymerization, comprising:
(i) preparing a first polymer in an aqueous medium by free-radical polymerization, and
(ii) preparing a second polymer in the presence of the first polymer obtained from step (i) by free-radical polymerization, forming the multistage emulsion polymer comprising the first polymer and the second polymer;
wherein the multistage emulsion polymer comprises, by weight based on the weight of the multistage emulsion polymer, from 0.1% to 10% of structural units of a nitrogen-containing heterocyclic monomer, and 5% or more of structural units of a cycloalkyl (meth) acrylate, a $C_6$-$C_{10}$ alkyl (meth) acrylate, or mixtures thereof;
wherein the second polymer comprises structural units of the nitrogen-containing heterocyclic monomer;
wherein Tg of the first polymer is at least 35° C. higher than that of the second polymer;
wherein the weight ratio of the first polymer to the second polymer is in the range of from 55:45 to 95:5.

9. An aqueous coating composition comprising the multistage emulsion polymer of claim 1, and a pigment and/or an extender.

* * * * *